(12) United States Patent
Guillou et al.

(10) Patent No.: US 10,215,400 B2
(45) Date of Patent: Feb. 26, 2019

(54) METHOD AND PLANT FOR REDOX CHEMICAL LOOPING COMBUSTION OF A SOLID HYDROCARBON FEEDSTOCK

(71) Applicants: IFP Energies nouvelles, Rueil-Malmasion (FR); TOTAL RAFFINAGE CHIMIE, Courbevoie (FR)

(72) Inventors: Florent Guillou, Ternay (FR); Tiago Sozinho, Feyzin (FR); Heloise Dreux, Lyons (FR); Helene Stainton, Lyons (FR)

(73) Assignees: IFP ENERGIES NOUVELLES, Rueil-Malmaison (FR); TOTAL RAFFINAGE CHIMIE, Courbevoie (FI)

( * ) Notice: Subject to any disclaimer, the term of this patent is extended or adjusted under 35 U.S.C. 154(b) by 525 days.

(21) Appl. No.: 14/897,866

(22) PCT Filed: Jun. 12, 2014

(86) PCT No.: PCT/FR2014/051434
§ 371 (c)(1),
(2) Date: Dec. 11, 2015

(87) PCT Pub. No.: WO2014/199091
PCT Pub. Date: Dec. 18, 2014

(65) Prior Publication Data
US 2016/0146456 A1 May 26, 2016

(30) Foreign Application Priority Data

Jun. 13, 2013 (FR) ..................... 13 55481

(51) Int. Cl.
*F23D 3/40* (2006.01)
*F23C 10/01* (2006.01)
(Continued)

(52) U.S. Cl.
CPC ............ *F23C 10/01* (2013.01); *F23C 10/002* (2013.01); *F23C 10/005* (2013.01); *F23C 10/04* (2013.01);
(Continued)

(58) Field of Classification Search
CPC ............ F23C 2900/99008; F23C 10/01; F23C 10/04; F23C 10/22; F23C 10/002;
(Continued)

(56) References Cited

U.S. PATENT DOCUMENTS

| 5,477,024 A | 12/1995 | Lawrence et al. |
| 6,709,636 B1 | 3/2004 | Oshita et al. |

(Continued)

FOREIGN PATENT DOCUMENTS

| CA | 2799139 A1 * | 12/2011 | ............ F23C 10/005 |
| FR | 2 850 156 A1 | 7/2004 | |

(Continued)

OTHER PUBLICATIONS

International Search Report for PCT/FR2014/051434 dated Aug. 12, 2014; English Translation submitted herewith (7 pages).

*Primary Examiner* — Jason Lau
(74) *Attorney, Agent, or Firm* — Fitch, Even, Tabin & Flannery LLP (57) ABSTRACT

The invention relates to a method and to a device for chemical looping combustion CLC of a solid hydrocarbon feed wherein it is proposed to inject the solid hydrocarbon feed so as to limit any occurrence of sticking of the feed to the walls of the injection device. The solid feed is fed into a conveying zone operating under fluidized bed conditions and opening into a combustion reactor. A fluidization gas is injected into this conveying zone while controlling the flow of gas in such a way that the superficial velocity of the gas in the conveying zone is higher than the terminal velocity of
(Continued)

the solid hydrocarbon feed particles and the terminal velocity of solid particles present in the combustion reactor, and while controlling the fluidization gas temperature in such a way that the temperature in the conveying zone is less than or equal to 500° C.

14 Claims, 3 Drawing Sheets

(51) Int. Cl.

| | | |
|---|---|---|
| *F23C 10/00* | (2006.01) | |
| *F23C 10/22* | (2006.01) | |
| *F23C 10/26* | (2006.01) | |
| *F23C 10/04* | (2006.01) | |
| *F23C 10/20* | (2006.01) | |
| *F23C 10/28* | (2006.01) | |
| *F23D 1/00* | (2006.01) | |

(52) U.S. Cl.
CPC .............. *F23C 10/20* (2013.01); *F23C 10/22* (2013.01); *F23C 10/26* (2013.01); *F23C 10/28* (2013.01); *F23D 1/00* (2013.01); F23C 2900/99008 (2013.01); Y02E 20/346 (2013.01)

(58) Field of Classification Search
CPC .......... F23C 10/08; F23C 10/20; F23C 10/26; F23C 10/28; F23C 13/08; F23C 99/00; F23C 10/005; F23C 13/06; F23C 2201/101; F23C 2900/99011; F23C 6/04; F23C 10/10; F23C 99/005; F23C 9/003; C10J 3/725; Y02E 60/528; Y02E 20/346; Y02E 60/364; Y02E 60/366; Y02E 60/13; Y02E 60/36; Y02E 10/542; Y02E 10/549; Y02E 20/326; Y02E 60/128; Y02E 60/142; Y02E 60/324; Y02E 60/521; Y02E 70/30; Y02E 20/322; Y02E 20/344; Y02E 20/363; Y02E 50/10; Y02E 50/14; Y02E 60/122; Y02E 60/368; Y02E 60/50; Y02E 60/527

See application file for complete search history.

(56) References Cited

U.S. PATENT DOCUMENTS

| | | |
|---|---|---|
| 2006/0130719 A1 | 6/2006 | Morin et al. |
| 2013/0118957 A1 | 5/2013 | Hoteit et al. |
| 2013/0149650 A1 | 6/2013 | Gauthier et al. |
| 2014/0295359 A1 | 10/2014 | Gauthier et al. |
| 2014/0335461 A1 | 11/2014 | Guillou et al. |

FOREIGN PATENT DOCUMENTS

| | | |
|---|---|---|
| FR | 2 960 940 A1 | 12/2011 |
| FR | 2 960 941 A1 | 12/2011 |
| FR | 2 980 258 A1 | 3/2013 |
| WO | 2008/095984 A2 | 8/2008 |
| WO | 2013/079817 A2 | 6/2013 |

* cited by examiner

METHOD AND PLANT FOR REDOX CHEMICAL LOOPING COMBUSTION OF A SOLID HYDROCARBON FEEDSTOCK

FIELD OF THE INVENTION

The present invention relates to the field of redox chemical looping combustion (CLC) of hydrocarbon feeds under fluidized bed conditions, and more specifically to the fluidized-bed chemical looping combustion of solid hydrocarbon feeds.

BACKGROUND OF THE INVENTION

In the text hereafter, what is referred to as CLC (Chemical Looping Combustion) is an oxidation-reduction or redox looping method on an active mass. It can be noted that, in general, the terms oxidation and reduction are used in connection with the respectively oxidized or reduced state of the active mass. The oxidation reactor, also referred to as air reactor, is the reactor where the redox mass is oxidized and the reduction reactor, also referred to as combustion reactor or fuel reactor, is the reactor where the redox mass is reduced.

The CLC method allows to produce energy from hydrocarbon-containing fuels while facilitating capture of the carbon dioxide emitted during combustion.

The CLC method consists in using redox reactions of an active mass, typically a metal oxide, for splitting the combustion reaction into two successive reactions. A first oxidation reaction of the active mass, with air or a gas acting as the oxidizer, allows the active mass to be oxidized. A second reduction reaction of the active mass thus oxidized, by means of a reducing gas, then allows to obtain a reusable active mass and a gas mixture essentially comprising carbon dioxide and water, or even syngas containing hydrogen and carbon monoxide. This technique thus enables to isolate the carbon dioxide or the syngas in a gas mixture practically free of oxygen and nitrogen.

The combustion being globally exothermic, it is possible to produce energy from this process, in form of vapour or electricity for example, by arranging exchange surfaces in the active mass circulation loop or on the gaseous effluents downstream from the combustion or oxidation reactions.

It is also possible to consider producing syngas or even hydrogen with such a CLC method by controlling the combustion and carrying out the required purifications downstream from the combustion process.

U.S. Pat. No. 5,447,024 describes for example a chemical looping combustion method comprising a first reactor for reduction of an active mass by means of a reducing gas and a second oxidation reactor allowing to restore the active mass in its oxidized state through an oxidation reaction with wet air. The circulating fluidized bed technology is used to enable continuous change of the active mass from the oxidized state to the reduced state thereof.

The active mass going alternately from the oxidized form to the reduced form thereof and conversely follows a redox cycle. It acts as an oxygen carrier by yielding its oxygen in a reduction zone (reduction reactor) under suitable operating conditions, and it is subsequently conveyed to an oxidation zone (oxidation reactor) where it is reoxidized on contact with an oxidizing gas (such as air or water vapour for example).

Thus, in the reduction reactor, active mass ($M_xO_y$) is first reduced to the state $M_xO_{y-2n-m/2}$ by means of a hydrocarbon $C_nH_m$ that is correlatively oxidized to $CO_2$ and $H_2O$, according to reaction (1), or optionally to a mixture $CO+H_2$, depending on the proportions used.

$$C_nH_m + M_xO_y \rightarrow nCO_2 + m/2H_2O + M_xO_{y-2n-m/2} \quad (1)$$

In the oxidation reactor, the active mass is restored to its oxidized state ($M_xO_y$) on contact with air according to reaction (2), prior to returning to the first reactor.

$$M_xO_{y-2n-m/2} + (n+m/4)O_2 \rightarrow M_xO_y \quad (2)$$

In the above equations, M represents a metal.

The reaction zones allowing chemical-looping combustion reactions to be conducted generally consist of fluidized beds or circulating fluidized beds, also referred to as transported beds.

The combustion of solid hydrocarbon feeds such as coal causes CLC plant fouling problems.

One major problem likely to arise upon the combustion of solid hydrocarbon feeds lies in the sticking of the solid fuel injected into the CLC plant, notably at the injector allowing the feed to be sent into the combustion reactor. In the case of gravity injection of coal into a fluidized bed for example, the significant heat generated in the injector, by conduction with the high-temperature bed of the combustion reactor, can lead to sticking of the crushed coal and cause an obstruction in the injector. A direct consequence of such an obstruction is the stoppage of the CLC unit and the implementation of a maintenance operation. This fouling phenomenon due to sticking of the feed is all the more significant as the proportion of volatile matter is large in the feed, as it is for example the case with biomass.

Another problem relates to the formation of ashes in the combustion reaction zone, and more particularly the formation of agglomerated bottom ash whose agglomeration may "foul" the reactor. This phenomenon affects the smooth operation of the CLC process and it may require complete stoppage of the plant for maintenance. Agglomerated bottom ash is a specific feature of the combustion of solid hydrocarbon feeds such as coal. Indeed, the mineral material content of solid fuels is not insignificant and, once combustion of the carbon and of the hydrogen is completed, solid residues called ashes form. Table 1 groups the analyses of two coals A and B by way of example. It can be observed that the ash content of the coals varies depending on the origin of the solid feed, but this content is not insignificant. It typically represents 5 to 20% of the mass of dry coal. Some solid fuels such as pet coke have much lower ash contents. There are also solid fuels with higher ash contents.

TABLE 1

Analysis of various coals

| | | | Coal A | Coal B |
|---|---|---|---|---|
| Dry coal analysis | Ashes | Wt. % | 10.3 | 14.8 |
| | Volatile matter | Wt. % | 37.6 | 24 |
| | Sulfur | Wt. % | 0.5 | 0.57 |
| | Specific heat | Kcal/kg | 6710 | 6630 |
| Ultimate analysis | C | Wt. % | 71.1 | 73.46 |
| | H | Wt. % | 4.77 | 3.87 |
| | N | Wt. % | 1.41 | 1.65 |
| | S | Wt. % | 0.5 | 0.57 |
| | Ashes | Wt. % | 10.3 | 14.76 |
| | O (by difference) | Wt. % | 11.92 | 5.69 |
| Ash composition | $SiO_2$ | Wt. % | 67 | 49.84 |
| | $Al_2O_3$ | Wt. % | 19.2 | 40.78 |
| | $Fe_2O_3$ | Wt. % | 5.2 | 2.9 |
| | CaO | Wt. % | 2 | 1.08 |
| | MgO | Wt. % | 1.2 | 0.26 |
| | $TiO_2$ | Wt. % | 0.9 | 1.96 |

TABLE 1-continued

Analysis of various coals

|   |   | Coal A | Coal B |
|---|---|--------|--------|
| $K_2O$ | Wt. % | 1.7 | 0.64 |
| $Na_2O$ | Wt. % | 1.7 | 0.06 |
| $SO_3$ | Wt. % | 0.9 | 0.52 |
| $P_2O_5$ | Wt. % | 0.2 | 1.05 |

The ashes resulting from the combustion of coal are made up of residual fine particles. Their melting temperature varies according to their composition and it generally ranges between 1000° C. and 1500° C. However, at lower temperatures, for example between 800° C. and 1000° C., it is possible to observe a phenomenon of agglomeration of the ash particles that become sticky. They can therefore either agglomerate with one another, or they agglomerate with the particles of oxygen-carrying material. Considering the operating conditions in the chemical-looping combustion process, two types of ashes can be distinguished:

fly ashes: they correspond to the ashes that are carried to the fuel reactor by the combustion gases. Fly ashes generally represent 50% to 99% of the ashes formed (typically 70% to 90%). Their grain size is relatively fine with generally at least 25% fines with sizes below 10 microns and 90% fines with sizes below 100 microns. The Sauter mean diameter representative of the fly ash grain size generally ranges between 5 and 30 microns, and it is typically close to 10 microns. The grain density of these ashes generally ranges between 2000 and 3000 kg/m$^3$, and it is generally close to 2500 kg/m$^3$;

agglomerated ashes: they correspond to the ashes that agglomerate with one another or with the oxygen-carrying material and that are too heavy to be carried to the fuel reactor by the combustion gases. These ashes are sometimes referred to as agglomerated bed ash or bottom ash. In the present description, this type of agglomerated ashes is referred to as "agglomerated bottom ash". The grain size of the agglomerated ashes is more delicate to estimate and depends on the conditions of implementation of the method. In general terms, the grain size of these ashes is estimated to be above 100 microns and their size can reach up to several millimeters.

Agglomerated bottom ash thus forms dense objects larger than the oxygen carrier particles, with fluidization properties that can evolve and be different from those of the oxygen carrier. These objects may then be no longer fluidized at the same time as the transported bed and they accumulate in the bottom of the combustion reactor.

For the ashes that remain fluidizable under the operating conditions, specific devices allowing them to be eliminated have been proposed, as described in French patent FR-2,850,156, or in French patent applications FR-2,960,940 and FR-2,960,941. However, these devices work only for the fines produced by attrition of the oxygen-carrying material (through chemical or mechanical aging effect), the unburned solid fuel particles ("unburned particles") and the fly ashes.

A specific device is necessary to discharge the agglomerated solids. A bottom valve open onto the fluidized bed and/or an endless screw directly supplied from the fluidized bed is generally used to discharge the agglomerated bottom ash from the lower part of the fluidized bed. Although these simple means provide a solution to the agglomerated bottom ash problem, they are by no means selective, and a larger proportion of oxygen carrier (predominant in the fluidized bed) than ashes proper will eventually be extracted.

An improved device is described in patent application FR-2,980,258. This document discloses a CLC plant wherein an agglomerated ash settling zone at the bottom of the combustion reactor comprises for example a cooled endless screw allowing a particle stream containing agglomerated ashes to be withdrawn. However, this device does not enable satisfactory extraction of the agglomerated bottom ash, which represents a small proportion of the particle stream withdrawn.

Non-selective or weakly selective extraction of agglomerated bottom ash can in the long term affect the process performances and increase the operating costs. Unintentionally extracted oxygen carrier particles may indeed represent a not insignificant part of the inventory that needs to be compensated by either supplying a new oxygen carrier or by recycling the oxygen carrier that has been separated from the ashes after cooling and screening, i.e. by external recycling.

SUMMARY OF THE INVENTION

The objective of the present invention is to overcome at least partly the aforementioned problems linked with the specific chemical looping combustion (CLC) of solid hydrocarbon feeds.

The present invention notably aims to meet the following objectives:

in general terms, provide a CLC method and plant allowing to limit CLC plant fouling problems and thus to reduce the maintenance operations related thereto, provide a CLC method and plant allowing to limit the occurrence of sticking of the solid hydrocarbon feeds to the feed injection system and to prevent obstruction of said injection system, provide a CLC method and plant allowing to discharge the unwanted grain size population made up of the agglomerated bottom ash, while limiting the redox active mass loss during said discharge, provide a CLC method and plant allowing to limit makeup inventory supply, i.e. makeup redox mass, during operation of the CLC unit, whether new redox mass supplies (first introduction in the CLC plant) or makeup redox mass from external recycling, for example resulting from a separation of the mass already used in the CLC plant and separated from other particles such as ashes after cooling and screening.

Thus, in order to meet at least one of the aforementioned objectives, among others, the present invention provides, according to a first aspect, a method for combustion of a solid hydrocarbon feed by oxidation-reduction in a chemical loop wherein a redox active mass circulates in particle form, comprising:

feeding the solid hydrocarbon feed in particle form into a conveying zone operating under fluidized bed conditions and opening into a combustion reactor, injecting into said conveying zone a first fluidization gas so as to create a dilute phase of the fluidized bed, while controlling the rate of flow of said gas in such a way that the superficial velocity of the gas in the conveying zone is higher than the terminal velocity of the solid hydrocarbon feed particles and the terminal velocity of solid particles present in the combustion reactor, and while controlling the temperature of said first gas in such a way that the temperature in the dilute phase of the conveying zone is less than or equal to 500° C., carrying out combustion of the solid hydrocarbon feed from the conveying zone through contact with the redox active mass within the fluidized-bed combustion reactor.

According to one embodiment, the superficial velocity of the gas in the dilute phase of the conveying zone ranges between 2 m/s and 50 m/s, preferably between 2 m/s and 35 m/s, more preferably between 2 m/s and 20 m/s, and more preferably yet between 3 m/s and 10 m/s.

According to an embodiment, the solid hydrocarbon feed in particle form is fed into the conveying zone through gravity flow by means of a gravity flow pipe and the solid hydrocarbon feed flow is controlled through regulation and sealing means arranged between the gravity flow pipe and a buffer zone for temporary storage of the solid hydrocarbon feed in particle form.

According to an embodiment, the solid hydrocarbon feed in particle form is fed into the conveying zone by means of an endless screw, the endless screw being supplied by a gravity flow of the solid feed coming from a buffer zone for temporary storage of the solid hydrocarbon feed in particle form, and the solid hydrocarbon feed flow is controlled through regulation and sealing means arranged between the endless screw and the buffer zone.

According to an embodiment, the solid hydrocarbon feed in particle form is fed into the conveying zone by means of a dense pneumatic conveying line, the dense pneumatic conveying line being supplied by a gravity flow of the solid feed coming from a buffer zone for temporary storage of the solid hydrocarbon feed in particle form and by a carrier gas, preferably of same nature as the first fluidization gas, and the solid hydrocarbon feed flow is controlled through regulation and sealing means arranged between the dense pneumatic conveying line and the buffer zone.

According to an embodiment, a raw solid hydrocarbon feed is sent from a storage zone to a mill so as to shape the hydrocarbon feed in particle form, the flow of said raw solid hydrocarbon feed being controlled by regulation and sealing means arranged between the mill and the storage zone, then the hydrocarbon feed in particle form is fed into the conveying zone by means of a pipe supplied from the mill into which a carrier gas is sent for carrying the feed into the pipe.

According to an embodiment, the following stages are carried out:
- extracting from the combustion reactor a mixture comprising redox active mass particles and bottom ash through an extraction line arranged in the bottom of the combustion reactor,
- feeding the mixture with a controlled flow rate into a separation zone consisting of a lower part of the conveying zone, arranged below an upper part of the conveying zone into which the solid hydrocarbon feed is fed,
- injecting a second fluidization gas into the separation zone, injection being performed by controlling the flow rate of said second fluidization gas:
  - so as to separate by elutriation the redox active mass particles and the bottom ash agglomerated within said mixture, the redox active mass particles being then conveyed to the combustion reactor and the agglomerated bottom ash falling under the effect of gravity to the bottom of the separation zone where they are discharged, and
  - so that the velocity of the gas from the mixture of the first fluidization gas and the second fluidization gas in the upper part of the conveying zone is higher than the terminal velocity of the solid hydrocarbon feed particles and the terminal velocity of solid particles present in the combustion reactor, and said injection is performed by controlling also the temperature of the second gas in such a way that the temperature of the conveying zone is less than or equal to 500° C.

According to an embodiment, the superficial velocity of the second fluidization gas in the separation zone is set at a value ranging between 30% and 300% of the average terminal velocity of the agglomerated bottom ash.

Preferably, the superficial velocity of the gas resulting from the mixture of the first fluidization gas and the second fluidization gas in the upper part of the conveying zone ranges between 0.7 m/s and 50 m/s.

According to an embodiment, the flow rate of the mixture sent to the separation zone is controlled in such a way that the volume fraction of all the particles of said redox active mass and of the agglomerated bottom ash is below 5% in the lower part of the conveying zone.

According to an embodiment, the flow rate of the mixture sent to the separation zone is controlled by means of an L-valve or an endless screw.

According to an embodiment, a third fluidization gas is injected into the combustion reactor, of same nature as the first fluidization gas and/or the second fluidization gas injected into the separation zone.

According to an embodiment, a fourth fluidization gas is injected into the extraction line upon extraction of the mixture comprising the redox active mass particles and the agglomerated bottom ash.

According to an embodiment, the mixture is fed to the separation zone through injection means for improving dispersion of the redox active mass particles and of the agglomerated bottom ash of the mixture over the entire section of the separation zone.

According to an embodiment, the second fluidization gas is injected into the separation zone at a first altitude and the mixture is fed at a second altitude, the first altitude being lower than the second altitude, and the difference between the first and second altitudes being greater than an equivalent diameter of the separation zone.

According to an embodiment, the conveying zone is a substantially vertical pipe.

According to an embodiment, the conveying zone is a substantially vertical pipe comprising an upper part and a lower part of different section.

Preferably, the solid hydrocarbon feed is selected from among coal, coke, pet coke, biomass, bituminous sands and household, agricultural or industrial waste.

According to an embodiment, the redox active mass reduced in the combustion reactor is reoxidized in an oxidation reactor prior to being again contacted with the solid hydrocarbon feed in the combustion reactor.

According to a second aspect, the invention provides a plant for chemical looping redox combustion of a solid hydrocarbon feed for implementing the method according to the invention, comprising a combustion reactor and an oxidation reactor, the combustion reactor comprising:
- a supply means for a redox active mass in particle form,
- a third fluidization gas supply means, and
- a supply means for a solid hydrocarbon feedstock in particle form, the solid hydrocarbon feedstock supply means comprising:
  - a conveying zone operating under fluidized bed conditions for conveying the solid hydrocarbon feed to the combustion reactor, said conveying zone having a temperature less than or equal to 500° C., means for injecting the solid hydrocarbon feed in particle form into the conveying zone, and means for injecting a first fluidization gas into the conveying zone, and the oxidation reactor comprising:

a supply means for the redox active mass particles reduced in the combustion reactor, an oxidizing gas supply means, a discharge means for the oxidizing gas reduced after oxidation of the redox active mass, and a discharge means for sending the reoxidized redox active mass particles to the combustion reactor.

According to one embodiment, the means for injecting the solid hydrocarbon feed into the conveying zone comprise a gravity flow pipe opening into the conveying zone, said pipe being supplied by a buffer zone via regulation and sealing means allowing the solid feed flow to be controlled.

According to an embodiment, the means for injecting the solid hydrocarbon feed into the conveying zone comprise an endless screw opening into the conveying zone, the endless screw being supplied by a buffer zone via regulation and sealing means allowing the solid feed flow to be controlled.

According to an embodiment, the means for injecting the solid hydrocarbon feed into the conveying zone comprise a dense pneumatic conveying line opening into the conveying zone, the conveying line comprising means for injecting a carrier gas intended to carry the solid hydrocarbon feed particles flowing from a buffer zone to the conveying zone, the flow of solid hydrocarbon feed particles from the buffer zone to the conveying line being controlled by regulation and sealing means.

According to an embodiment, the means for injecting the solid hydrocarbon feed into the conveying zone comprise:

a raw solid hydrocarbon feed storage zone, a mill for crushing the raw solid hydrocarbon feed coming from the storage zone in the form of particles capable of being fluidized in the conveying zone, said mill comprising carrier gas injection means, a pipe receiving a mixture of carrier gas and of solid hydrocarbon feed particles from the mill, and opening into the conveying zone.

According to an embodiment, the plant also comprises:

a pipe for extracting a mixture comprising redox active mass particles and agglomerated bottom ash contained in the combustion reactor, said extraction pipe being positioned in the bottom of said reactor, a separation zone consisting of a lower part of the conveying zone, for separation by elutriation of the mixture coming from the extraction pipe, the separation zone comprising:

a supply means for the mixture coming from the extraction pipe, the supply means comprising means of controlling the flow rate of the mixture fed into the separation zone, and optionally comprising mixture injection means for improving dispersion of said mixture in the separation zone, means for injecting a second fluidization gas, a dilute phase zone of the fluidized bed in the upper part of the separation zone, and an agglomerated bottom ash discharge means arranged in the lower part of the separation zone.

According to an embodiment, the means for injecting the second fluidization gas into the separation zone include a multiple injection system.

According to an embodiment, the means for injecting the second fluidization gas into the separation zone are positioned at a first altitude and the means for feeding the mixture to the separation zone are positioned at a second altitude higher than the first altitude, the difference between the first and second altitudes being greater than an equivalent diameter of the separation zone.

According to an embodiment, the means for controlling the flow rate of the mixture fed into the separation zone consist of an L-valve or an endless screw.

According to an embodiment, the line for extracting the mixture of redox active mass particles and of agglomerated bottom ash comprises a supply means for a fourth fluidization gas.

According to an embodiment, the discharge means for the agglomerated bottom ash comprises means for controlling the flow of agglomerated ash discharged.

According to an embodiment, the separation zone is a substantially vertical pipe.

According to an embodiment, the plant furthermore comprises an oxidation reactor provided with a supply means for particles of reduced redox active mass in the combustion reactor, an oxidizing gas supply means, a discharge means for the reduced oxidizing gas after oxidation of the redox active mass, and a discharge means for sending the particles of reoxidized redox active mass to the combustion reactor.

BRIEF DESCRIPTION OF THE FIGURES

Other features and advantages of the invention will be clear from reading the description hereafter of embodiments given by way of non limitative example, with reference to the accompanying figures wherein:

FIGS. 1 to 5 are diagrams illustrating the implementation of the CLC method according to various embodiments of the invention.

In the figures, the same reference numbers designate identical or similar elements.

DETAILED DESCRIPTION

Terminology

What is referred to as agglomerated bottom ashes in the present description are the ashes formed upon combustion of the solid hydrocarbon feed, which have agglomerated with one another or with other solid particles such as the redox active mass particles or unburned particles. The agglomerated bottom ashes form a solid particle population that is not fluidizable under the conditions of the process and that one wants to discharge from the combustion reactor.

A dense fluidized bed is understood to be a fluidized bed wherein gas fraction $\varepsilon_g$ is less than 0.9, preferably less than 0.8. A dilute fluidized bed is understood to be a fluidized bed wherein the volume fraction of redox active mass particles is less than 10 vol. %.

The superficial velocity of a gas is understood to be the ratio of the volume flow rate of gas under process conditions passing through the cross-sectional area of the reactor ($m^3/s$) to the cross-sectional area of the reactor ($m^2$).

In the present invention, the expressions "oxygen carrying material" and "redox active mass" are equivalent. The redox mass is referred to as active in connection with the reactive capacities thereof, in the sense that it is capable of acting as the oxygen carrier in the CLC process by capturing and releasing oxygen. The redox active mass can undergo an activation stage so as to increase the reactive capacities thereof, which can consist of a preferably progressive temperature rise stage, preferably in an oxidizing atmosphere (air for example). This activation stage can for example be carried out in the CLC plant, in particular by introducing the redox mass particles upon starting the process, prior to initiating the redox cycles with introduction of fuel in the process.

What is referred to as "raw" solid hydrocarbon feed is a feed that has not been conditioned so as to be fluidized under the operating conditions of the CLC process, in particular from the point of view of the grain size thereof. The raw feed generally comes in form of coarse particles whose diameter typically ranges between 5 mm and 60 mm. Such a raw feed can be wet. The expression raw feed in connection with the solid hydrocarbon feed is to be contrasted with the expression conditioned feed in the present description.

The present invention relates to a method for combustion of a solid hydrocarbon feed by oxidation-reduction in a chemical loop in which a redox active mass circulates in particle form (CLC process), wherein it is proposed to inject the solid hydrocarbon feed so as to limit any occurrence of sticking of the feed to the walls of the injection device.

The solid hydrocarbon feed can be, for example, coal, coke, pet coke, biomass, pretreated or not, bituminous sands or household, agricultural or industrial waste.

Figure 1:
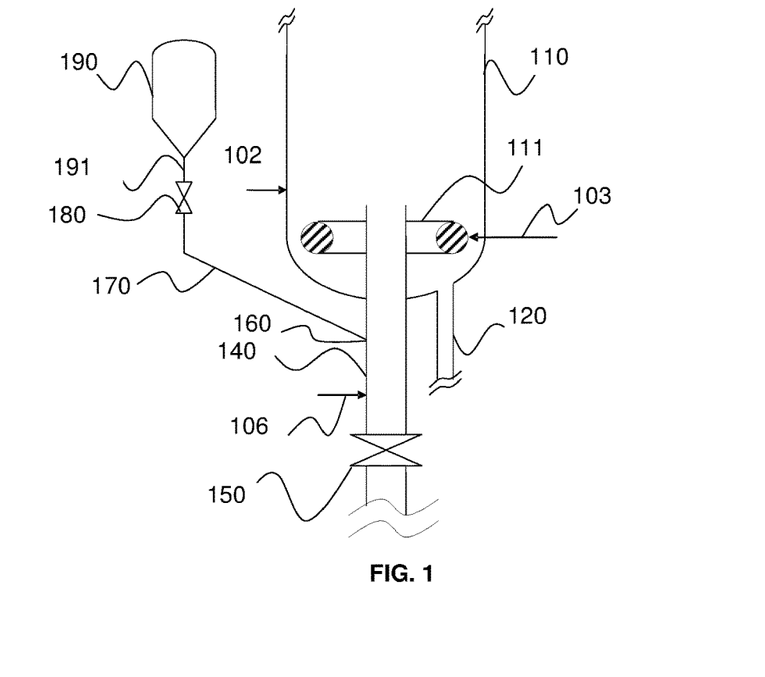

FIG. 1 shows an embodiment of the CLC method and of the CLC plant according to the invention. For simplicity reasons, only the part of the CLC plant necessary for the description of the present invention is shown. Thus, the oxidation reactor where the active mass is oxidized prior to being sent to combustion reactor 110 and forming a chemical loop is not shown in the diagram, and neither is the upper part of the combustion reactor.

In the method according to the invention, combustion of the solid hydrocarbon feed in particle form is carried out through contact with the redox active mass within combustion reactor 110 under fluidized bed conditions. Upon combustion, the redox active mass is reduced. The bed is fluidized by a fluidization gas 103 fed, for example, through a fluidization internal 111 such as a ring. The redox active mass acting as the oxygen carrier can be directly injected into combustion reactor 110 through a feed line 102 coming from the oxidation reactor. The redox active mass is generally the predominant species in combustion reactor 110. It comes in form of fluidizable particles belonging to groups A, B or C of Geldart's classification. The redox active mass particles preferably belong to group B of Geldart's classification. Preferably, the grain size distribution of the redox active mass is such that more than 90% of the particles have a size ranging between 100 μm and 500 μm, preferably between 150 μm and 300 μm, and a density ranging between 1000 kg/m$^3$ and 5000 kg/m$^3$, preferably between 1500 kg/m$^3$ and 4000 kg/m$^3$.

The redox mass can consist of metal oxides such as, for example, Fe, Ti, Ni, Cu, Mn, Co, V oxides, alone or in admixture, which can be derived from ores (ilmenite or pyrolusite for example) or synthetic (for example nickel oxide particles supported on alumina NiO/NiAl2O4), with or without a binder, and it has the required redox properties and the characteristics necessary for fluidization. The oxygen storage capacity of the redox mass advantageously ranges, depending on the type of material used, between 1 and 15 wt. %. Advantageously, the amount of oxygen actually transferred by the metal oxide ranges between 1 and 2 wt. %, which allows to use only a fraction of the oxygen transfer capacity, ideally less than 30% thereof, so as to limit the risk of mechanical aging or agglomeration of the particles.

Fluidization gas 103 is introduced in such a way that, at the process temperature ranging between 800° C. and 1200° C. (temperature in the combustion reactor and the oxidation reactor), the superficial velocity of the gas is substantially higher than the minimum fluidization velocity $u_{MF}$ of the redox active mass particles, generally 3 to 5 times as high as $u_{MF}$. Minimum fluidization velocity $u_{MF}$ occurs when the tensile force exerted by the upward displacement of the gas is equal to the weight of the particles (Fluidization Engineering, Kunii and Levenspiel, 1991). The minimum fluidization velocity depends on the density and the grain size of the solid, and on the viscosity and the density of the gas. By way of example, for a solid with a diameter of 200 μm and a density of 3250 kg/m$^3$ at 900° C. in air, minimum fluidization velocity $u_{MF}$ is 1.7 cm/s.

For combustion of the solid feed, it is preferably crushed as finely as possible, which allows to promote the fluidization thereof, as well as fast reaction thereof with the reactants present. The crushing fineness substantially increases the surface area exposed to the reactants. The solid hydrocarbon feedstock fed to the combustion reactor has thus preferably been crushed to a mean diameter below 1 mm, preferably below 500 μm and more preferably below 100 μm.

Combustion reactor 110 comprises a supply means for the solid hydrocarbon feed in particle form, this supply means comprising a fluidized-bed conveying zone 140 for carrying the solid hydrocarbon feed to combustion reactor 110, means 160 for injecting the solid hydrocarbon feed in particle form into conveying zone 140 and means for injecting a first fluidization gas 106 into the conveying zone.

The solid hydrocarbon feed in particle form is injected into fluidized-bed conveying zone 140 opening into combustion reactor 110.

Fluidization gas 106 is fed into this conveying zone 140 so as to create a dilute phase of the fluidized bed. This stage is carried out on the one hand by controlling the flow of gas 106 in such a way that the superficial velocity of the gas in conveying zone 140 is higher than the terminal velocity of the solid hydrocarbon feed particles and the terminal velocity of solid particles present in combustion reactor 110, and on the other hand by controlling the temperature of gas 106 in such a way that the temperature (in the dilute phase) of conveying zone 140 is less than or equal to 500° C., preferably less than or equal to 450° C., more preferably less than or equal to 400° C. and, more preferably yet, less than or equal to 300° C. Occurrence of hydrocarbon feed sticking and agglomeration on the walls of the solid hydrocarbon feed supply device of the CLC plant is thus limited. The temperature of the conveying zone is preferably determined according to the type of solid feed injected.

Preferably, the superficial velocity of the gas in the conveying zone ranges between 2 m/s and 50 m/s, more preferably between 2 m/s and 35 m/s, more preferably yet between 2 m/s and 20 m/s, and most preferably between 3 m/s and 10 m/s.

The solid hydrocarbon feed is then sent to combustion reactor 110 to achieve combustion thereof through contact with the redox active mass.

Fluidization gas 106 is preferably selected compatible with the process, and more preferably it is of same nature as fluidization gas 103 of combustion reactor 110. A gas limiting coke formation is preferably selected, such as $CO_2$ or water vapour for example. More preferably, water vapour is used as the fluidization gas.

Solid hydrocarbon feed injection means 160 can comprise various devices described in connection with FIGS. 2 to 4, for example a simple gravity flow line as shown in FIG. 1, a line where the feed is pneumatically conveyed, or a mechanical conveyance device such as an air lock or an endless screw.

In the embodiment of the invention shown in FIG. 1, introduction of the hydrocarbon feed into the conveying zone is achieved by gravity flow using a gravity-flow pipe 170. The flow of the solid hydrocarbon feed is controlled by regulation and sealing means 180 positioned between gravity-flow pipe 170 and a buffer zone 190 for temporary storage of the solid hydrocarbon feed in particle form. Regulation and sealing means 180 can be a rotary seal valve for example. One advantage of this configuration lies in the simple implementation thereof.

A bottom valve 150 is not intended to be continuously open but it is designed for discharge of the materials that may not have been transported, which are then discharged by gravity to the lower part of conveying zone 140. By way of non-limitative example, it can be a sluice or crust breaking type valve.

Figure 2:
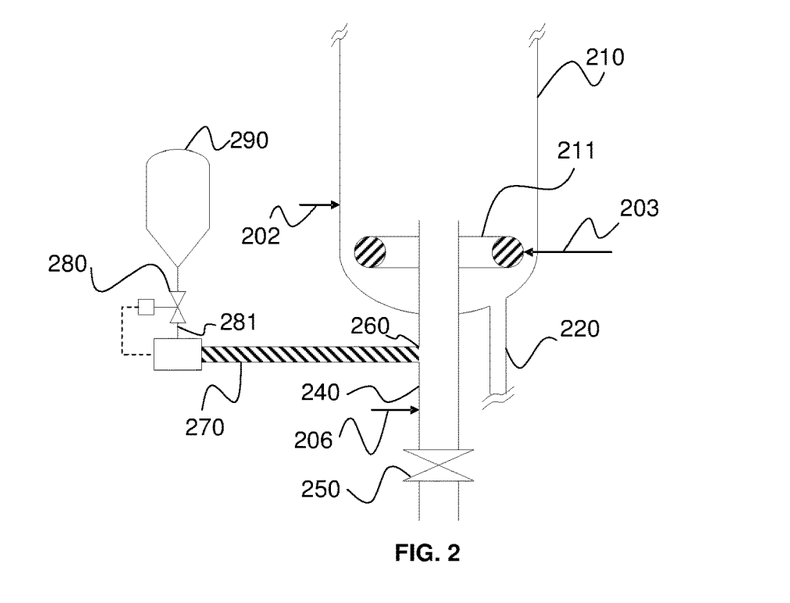

FIG. 2 illustrates another embodiment of the invention where the CLC method, identical to the one described in connection with FIG. 1, comprises feeding the solid hydrocarbon feed in particle form into conveying zone 240 by means of an endless screw 270. Endless screw 270 is supplied through a gravity flow of solid feed 281 from a buffer zone 290 allowing temporary storage of the solid hydrocarbon feed in particle form. The solid hydrocarbon feed flow is controlled using regulation and sealing means 280 arranged between endless screw 270 and buffer zone 290. Regulation and sealing means 280 can be a rotary seal valve for example.

The screw rotating at controlled speed allows fine and therefore precise control of the supply of solid hydrocarbon feed particles to conveying zone 240.

The means for injecting the solid hydrocarbon feed into the conveying zone of the CLC plant according to this configuration thus include endless screw 270 opening into conveying zone 240, this endless screw being supplied through buffer zone 290 via regulation and sealing means 280 allowing the solid feed flow to be controlled.

Figure 3:
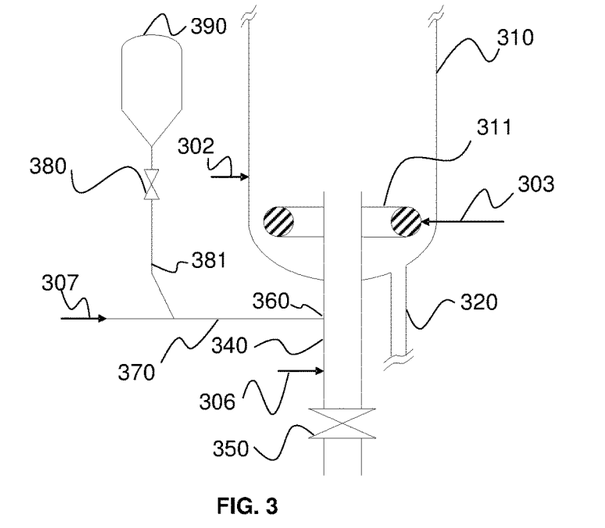

FIG. 3 illustrates yet another embodiment of the invention where the CLC method, identical to the one described in connection with FIG. 2, comprises feeding the solid hydrocarbon feed in particle form into conveying zone 340 by means of a dense pneumatic conveying line 370. This conveying line 370 is supplied, on the one hand, by a gravity flow of solid feed 381 from a buffer zone 390 for temporary storage of the solid hydrocarbon feed in particle form and, on the other hand, by a carrier gas 307 of preferably same nature as first fluidization gas 306. The solid hydrocarbon feed flow is controlled by regulation and sealing means 380 arranged between dense pneumatic conveying line 370 and buffer zone 390. Regulation and sealing means 380 can be a rotary seal valve.

This configuration notably allows to provide regular flow of the hydrocarbon feed through the agency of means of limited cost.

The CLC plant according to this configuration comprises means for injecting the solid hydrocarbon feed into conveying zone 340 that include a dense pneumatic conveying line 370. This line opens into conveying zone 340 and it comprises means of injecting carrier gas 307 for carrying the solid hydrocarbon feed particles flowing from buffer zone 390 to conveying zone 340, the flow of the solid hydrocarbon feed particles from buffer zone 390 to conveying line 370 being controlled by regulation and sealing means 380.

Figure 4:
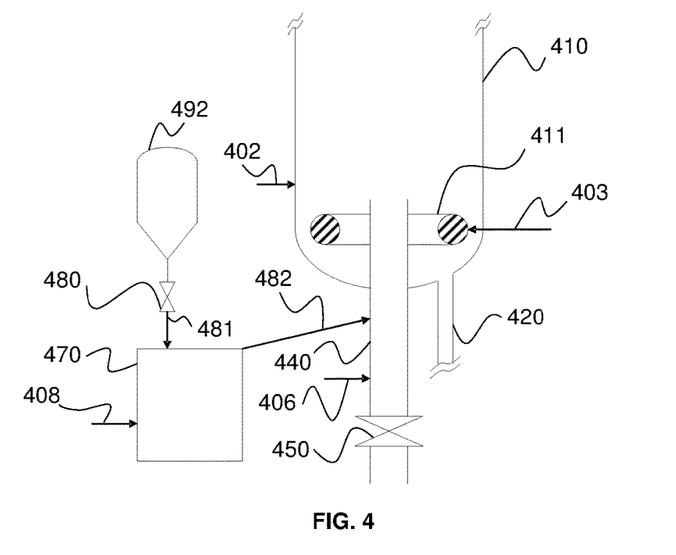

FIG. 4 shows another embodiment of the invention where the CLC method, identical to the one described in connection with FIG. 2, comprises sending a raw solid hydrocarbon feed from a storage zone 492 to a mill 470 for shaping the hydrocarbon feed in particle form. The flow of the raw solid hydrocarbon feed is controlled by regulation and storage means 480 arranged between mill 470 and storage zone 492. The hydrocarbon feed in particle form is then fed into conveying zone 440 through a pipe 482 supplied by the mill to which a carrier gas 408 is sent for conveying the feed to pipe 482.

In this configuration, the hydrocarbon feed is a raw solid crushed upstream from the device and sent directly into the supply device delivering the hydrocarbon feed to the combustion reactor.

There is no buffer capacity of the hydrocarbon feed conditioned for chemical looping combustion. The feed is a raw solid fuel, potentially still wet, whose size, generally ranging between 5 mm and 60 mm, does not allow fluidization thereof.

By way of example, the means for controlling the raw hydrocarbon feed can be a rotary seal valve or a metering hopper if the size of the feed does not allow a rotary seal valve to be used.

The mill, in addition to its function of shaping the particles (grain size) of the hydrocarbon feed for fluidizing them under the operating conditions of the CLC method, can if need be adjust the apparent moisture of the feed so as to make it compatible with the pneumatic conveying system. The technology of the mill can be, for example, a ball, pendular or roller type technology. A ball or pendular mill is preferably used.

Carrier gas 408 is preferably compatible with chemical looping combustion and it is more preferably yet of same nature as carrier gas 406.

It is possible, with this configuration where injection of the feed is performed indirectly through the conveying zone rather than directly into the combustion reactor, not to impact the operation of the mill by adjusting the flow of carrier gas 408 to the optimum operation thereof. This configuration also affords the advantage of allowing the residence time of the solids in conveying zone 440 to be independently controlled by adjusting the flow of fluidization gas 406.

As regards the CLC plant, the means for injecting the solid hydrocarbon feed into the conveying zone according to this configuration thus comprise:
  storage zone 492 for the raw solid hydrocarbon feed,
  mill 470 for crushing the raw solid hydrocarbon feed coming from storage zone 492 in the form of particles capable of being fluidized in conveying zone 440, the mill comprising means for injecting carrier gas 408,
  a pipe receiving a mixture of carrier gas and of particles of the solid hydrocarbon feed from mill 470, and opening into conveying zone 440.

In the method according to the invention, the redox active mass reduced in the combustion reactor is reoxidized in an oxidation reactor prior to being again contacted with the solid hydrocarbon feed in the combustion reactor.

Figure 5:
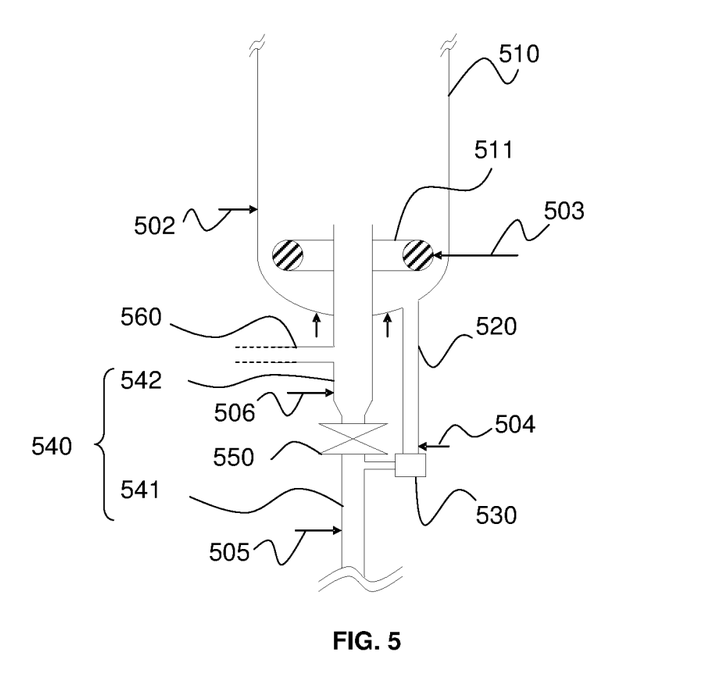
FIG. 5 illustrates in particular an embodiment of the invention wherein, in addition to injecting the solid hydrocarbon feed so as to limit any feed sticking occurrence, the agglomerated bottom ash is discharged from the CLC plant.

Advantageously, the method according to the invention furthermore comprises elimination of the agglomerated bottom ash whose accumulation contributes to clogging the combustion reactor while allowing to limit redox active mass losses upon elimination of these ashes. FIG. 5 shows a particular embodiment of the invention where such an agglomerated bottom ash elimination is carried out.

Examples of the advantages afforded by combining the hydrocarbon feed injection as described above and the particular bottom ash elimination described below are the synergistic effect of cleaning the conveying zone into which the solid hydrocarbon feed particles are injected, which could however undergo sticking despite the precautions taken, this cleaning being achieved by an abrasive effect of the flow of redox active mass particles carried to the combustion reactor. The combination of the hydrocarbon feed injection and of the bottom ash elimination according to the invention also allows to advantageously preheat the solid hydrocarbon feed on contact with the recycled hot redox active mass conveyed in the separation zone towards the combustion reactor.

FIG. 5 illustrates an embodiment of the invention wherein an unwanted grain size population present in the combustion reactor and consisting of the agglomerated bottom ash is eliminated.

Combustion of the solid hydrocarbon feed in the fluidized bed can cause, through redox active mass reduction, sintering or agglomeration of the ashes upon formation of non fluidizable objects under the process conditions. The accumulation thereof can affect the smooth operation of the process and lead to more frequent stoppage for maintenance, thus requiring complete stop of the unit.

This agglomerated bottom ash elimination is performed so as to limit the loss of redox active mass withdrawn from the combustion reactor together with the agglomerated ashes.

In order to eliminate these objects, indicated by the generic denomination agglomerated bottom ash, a mixture comprising particles of said redox active mass and agglomerated bottom ash are extracted from combustion reactor 510 through an extraction line 520 arranged in the bottom of the combustion reactor. The mixture thus extracted can comprise gas present in the combustion reactor that is carried along with the solid and that corresponds to the inter-grain spaces of the particles (active mass and ashes). Flow can be facilitated by injecting a fluidization gas 504 into extraction line 520, which then comprises means for injecting such a gas. The mixture comprising the solid particles flows towards mixture circulation control means 530.

These means 530 for controlling the flow of the solid particle mixture can be a mechanical valve, a pneumatic valve of L, V or J valve type, or a mechanically driven conveyor such as an endless screw. These control means advantageously allow to adapt the extraction of the agglomerated bottom ash to the rate of formation thereof, and therefore to limit more generally the energy consumption of the process.

The particle mixture is then fed at a controlled flow rate into a separation zone consisting of a lower part 541 of conveying zone 540, arranged beneath an upper part 542 of conveying zone 540 where the solid hydrocarbon feed is introduced.

Passing from mixture circulation control means 530 to separation zone 541 can be achieved by means of an injection device or an internal (not shown) so as to improve dispersion of the solid particles of the mixture over the entire section of separation zone 541.

Preferably, the flow rate of the solid particle mixture controlled by control means 530 is adjusted in such a way that the volume fraction of the particles in the gas stream generally ranges between 1% and 5%, preferably between 1% and 2% in the dilute phase of separation zone 541.

Separation zone 541 is advantageously a pipe, preferably substantially vertical.

Separation zone 541 comprises, in addition to the solid particle mixture supply means comprising control means 530 and optionally the mixture dispersing injection means, a supply means for a fluidization gas 505 selected compatible with the reactions and the applications of reactor 510.

Fluidization gas 505 is injected into the separation zone so as to create a dilute phase of the fluidized bed. This dilute phase zone is positioned in the upper part of separation zone 541 and it is extended by upper part 542 of the conveying zone, which opens into combustion reactor 510. The superficial velocity of the gas in the dilute phase of said separation zone is controlled so as to separate by elutriation the redox active mass particles and the bottom ash agglomerated within the mixture. The redox active mass particles are then carried to upper part 542 of conveying zone 540 and the agglomerated bottom ash falls under the effect of gravity onto the bottom of separation zone 541 from where it is discharged.

The injection of gas 505 can be multiple (not shown). Gas 505 can be injected through a distribution internal (not shown). Gas wall injection can also be performed.

Injected gas 505 is so selected as not to impact the reaction that takes place in reactor 510. Injected gas 505 is preferably of same nature as fluidization gas 503 injected into reactor 510. This gas is for example selected from among air, nitrogen, water vapour or $CO_2$.

Preferably, injection of gas 505 is carried out at a lower altitude than that of the solid particle mixture supply. The injection altitude difference is preferably greater than the diameter of separation zone 541 or an equivalent diameter if separation zone 541 does not have a circular section. The equivalent diameter corresponds in this case to the diameter of a pipe of circular section whose section has the same surface area as the section developed by the zone of non-circular section.

The superficial velocity of the gas in the dilute phase of separation zone 541 is set at a value generally ranging between 30 and 300% of the average terminal velocity of the agglomerated bottom ash, preferably ranging between 75% and 125%.

The terminal velocity is calculated as follows (Fluidization Engineering, Butterworth-Heinemann, Daizo Kunii, Octave Levenspiel, p. 80):

$$V_t = \sqrt{\frac{4 \cdot d_p \cdot (\rho_s - \rho_g) \cdot g}{3 \cdot \rho_g \cdot C_D}} \quad (3)$$

with:
$d_p$ the mean diameter of the particles
$\rho_s$ the density of the particles (kg/m³)
$\rho_g$ the density of the gas (kg/m³)
$C_D$ the drag coefficient.

The superficial velocity of the gas in the dilute phase of separation zone 541 can be controlled by adjusting the flow of fluidization gas 505 injected into separation zone 541 for a given separation zone configuration.

The velocity of fluidization gas 505 is preferably adjusted so as to carry towards the reactor the redox active mass particles whose size is below 500 µm, preferably below 300 µm. The superficial velocity of the gas in the dilute phase of separation zone 541 is preferably greater than 11 times the minimum rate of fluidization of the redox active mass, so that the major part of the active mass particles is conveyed towards the reactor.

Preferably, the superficial velocity of the gas in the dilute phase of separation zone 541 ranges between 0.7 m/s and 50 m/s, preferably between 0.7 m/s and 35 m/s, more preferably between 0.7 m/s and 20 m/s, more preferably yet between 1.5 m/s and 10 m/s, and most preferably between 3 m/s and 10 m/s.

The velocity in the dilute phase of separation zone 541 can be varied, notably above 10 m/s or even 20 m/s so as to adjust the residence time of the particles. However, velocities of 50 m/s and preferably velocities of 35 m/s should not be exceeded so as not to affect the integrity of the constituent materials of separation zone 541, such as refractories, or not to promote too greatly attrition of the solid particles used in the fluidized bed of combustion reactor 510.

The controlled superficial gas velocity in the dilute phase of separation zone 541 allows separation by elutriation of the two types of solid particles of the mixture and, as a consequence, on the one hand transport of the particles whose terminal velocity is substantially lower than the superficial gas velocity, i.e. the redox active mass, the solid unburned particles, the fly ashes, and on the other hand gravity fall of the agglomerated bottom ash in the lower part of separation zone 541. The agglomerated bottom ash is collected at the bottom of the lower part of separation zone 541 by means of a discharge means. Preferably, the agglomerated bottom ash discharge device comprises means for controlling the solid flow allowing, on the one hand, to provide sealing with the outside atmosphere of the unit and, on the other hand, to provide precise regulation of the solid flow. Such a discharge device can for example comprise a liquid guard, a collection drum, a rotary seal valve, an air lock or a simple mechanical valve that can open intermittently (not shown). The discharge means, which can be one of the aforementioned devices for example, is selected so as not to affect the nominal operation of the unit. The agglomerated bottom ash is then removed from the CLC unit through a pipe (not shown) that has no limit angle and can go from the horizontal to the descending vertical. The redox active mass particles transported in the dilute phase of separation zone 541 by fluidization gas 505 are then sent to upper part 542 of conveying zone 540 in order to be fed again to combustion reactor 510. The essential part of the active mass extracted through the extraction line simultaneously with the bottom ash is indeed redirected towards the combustion zone. Preferably, more than 70 mass % of the redox active mass particles are recycled to the stream extracted through the extraction line, more preferably more than 80% and more preferably yet more than 90%.

The separation performed thus allows to eliminate the agglomerated bottom ash whose accumulation may foul the combustion reactor and affect the smooth operation of the CLC unit, while allowing internal recycling of the redox active mass, thus limiting makeup inventory supplies (redox active mass) in the process.

In this embodiment, both the temperature of first fluidization gas 506 for fluidizing the hydrocarbon feed and the temperature of second fluidization gas 505 are controlled in such a way that the temperature in the conveying zone is less than or equal to 500° C., preferably less than or equal to 450° C., more preferably less than or equal to 400° C. and, more preferably yet, less than or equal to 300° C.

The diameter, or equivalent diameter, of lower part 541 of conveying zone 540 (separation zone) and the diameter of upper part 542 of conveying zone 540 can be different depending on the implementation constraints of the method, such as the gas flows to be applied for fluidizing the solid particles and the impact of these gases on the process, or the amounts of agglomerated bottom ash to be removed or of hydrocarbon feed to be injected.

An optional bottom valve 550 is not intended to be closed but it can be provided, if need be, with a mechanical means for isolating parts 541 and 542 from conveying zone 540.

EXAMPLES

Example 1

This example relates to the configuration described in connection with FIG. 5.

The fluidized bed of combustion reactor 510 is a 2-MWth coal combustion fluidized bed. It is supplied with 0.078 kg/s of South African coal whose characteristics are given in Table 2 hereafter.

TABLE 2

| Composition and characteristics of the carbon feed | | |
|---|---|---|
| C | Wt. % | 70.00 |
| H | Wt. % | 4.14 |
| O | Wt. % | 9.32 |
| N | Wt. % | 1.84 |
| S | Wt. % | 0.80 |
| Ashes | Wt. % | 13.90 |
| Volatile matter % | % | 29.90 |
| Fixed carbon % | % | 56.20 |
| Humidity % | % | 4.00 |
| Ultimate drying LHV | kJ/kg | 26.843 |
| Air drying LHV | kJ/kg | 25.769 |
| Raw coal flow | kg/s | 0.078 |

The combustion reactor is operated in CLC mode at 950° C. under fluidized bed conditions. The fluidized bed is supplied with 5.11 kg/s of redox active mass through supply means 502. The bed is fluidized by 0.04 Nm$^3$/s water vapour 503.

A mixture comprising agglomerated bottom ash and active mass particles is extracted from reactor 510 through extraction line 520 at a flow rate of 0.5 kg/s. The solid extracted from the reactor bottom has a higher agglomerated bottom ash concentration. The solid mixture extracted consists of 80% of redox active mass and 20% of agglomerated bottom ash. 95% of the redox active mass particles have a grain size in the 150 μm-300 μm range and the density thereof is 4190 kg/m$^3$. The particle diameter of the agglomerated bottom ash is above 750 μm and the density thereof is at least 2600 kg/m$^3$. The present example is based on the 750 μm and 2600 kg/m$^3$ limit case.

The respective terminal velocities are:
for the agglomerated bottom ash: 5.71 m/s
for the oxide particles: 1.15 m/s.

In this system, the gas velocity is adjusted at 3 m/s in the dilute phase of separation zone 541, whose diameter is 0.1 m, by fluidization gas 505. Under such conditions, 95% of the redox active mass particles and 0.1% of the agglomerated bottom ash are entrained towards the upper part of the conveying zone, in the direction of the combustion reactor, i.e. 0.38 kg/s oxygen carrier and 0.1 g/s agglomerated bottom ash. This implies that 99.9% of the agglomerated bottom ash and 5% of the metal oxide particles fall to the bottom of separation zone 541 and are discharged out of the CLC unit, i.e. 0.02 kg/s active mass and 99.9 g/s agglomerated solids.

Fluidization of pipe 541 is achieved with 0.46 mol/s low-pressure vapour at 150° C. When this gas stream encounters the solid stream from mixture flow control means 130 at 950° C., the resulting gas/solid mixture temperature is 919° C.

The lower part of pipe 542 is fluidized by low-pressure vapour 206 at 150° C. with a flow of 0.745 mol/s. This vapour 506 mixes with the gas and solid stream from separation zone 541, which results in a new gas/solid mixture at 467° C. The feed coming from injection device 560 is fed at a rate of 0.078 kg/s and at a temperature of 15° C. This hydrocarbon feed mixes with the ascending gas/solid stream in pipe 542. Heating of the feed and vaporization of the intrinsic humidity results in a new gas/solid mixture temperature of 298° C. in conveying zone 542.

Assuming that conveying zone 542 has the same diameter as pipe 541, i.e. 0.1 m, the resulting superficial gas velocity in this zone is 8.2 m/s. This velocity is much higher than the 0.23 m/s terminal velocity of the coal particles (for a mean diameter of 100 μm and a density of 1500 kg/m$^3$).

Example 2

Example 2 is a comparative example corresponding to an implementation of the CLC method according to the prior art. We consider in this example the same configuration as in Example 1 as regards equipments 510, 503, 530. However, in this example, there is no elimination of the ashes according to the invention and extraction line 520 does not open onto a separation zone, but directly onto the outside.

The solid mixture extracted from the unit at a rate of 0.5 kg/s has a composition of 20% agglomerated bottom ash as defined in Example 1 and 80% redox active mass as defined in Example 1.

Table 3 gives the data relative to the streams extracted from line 520 and from the CLC unit (bottom of 140) for Examples 1 and 2.

TABLE 3

Input/output comparative of Examples 1 and 2

| | Ex1 (120) | Ex2 (120) | Ex1 (bottom of 140) | Ex2 (bottom of 140) |
|---|---|---|---|---|
| Flow (kg/s) | 0.5 | 0.5 | 0.120 | 0.5 |
| Agglomerated bottom ash % | 20 | 20 | 83 | 20 |
| Active mass % | 80 | 80 | 17 | 80 |

The redox active mass outputs need to be compensated by a makeup supply so as to maintain the unit inventory. This makeup supply is 1.73 ton/day for Example 1 and 34.6 ton/day for Example 2, for an amount of eliminated agglomerated bottom ash substantially equivalent to 8.63 ton/day for Example 1 and 8.64 ton/day for Example 2. This comparison illustrates well the capacity of the method and of the plant according to the invention to limit the active mass loss upon elimination of the agglomerated bottom ash in the combustion reactor.

The invention claimed is:

1. A method for combustion of a solid hydrocarbon feed by oxidation-reduction in a chemical loop wherein a redox active mass circulates in particle form, comprising:
    feeding the solid hydrocarbon feed in particle form into a conveying zone operating under fluidized bed conditions and opening into a combustion reactor,
    injecting into the conveying zone a first fluidization gas so as to create a dilute phase of the fluidized bed, while controlling the rate of flow of the first fluidization gas in such a way that the superficial velocity of the gas in the conveying zone is higher than the terminal velocity of the solid hydrocarbon feed particles and the terminal velocity of solid particles present in the combustion reactor, and while controlling the temperature of the first gas in such a way that the temperature in the dilute phase of the conveying zone is less than or equal to 500° C.,
    carrying out combustion of the solid hydrocarbon feed from the conveying zone through contact with the redox active mass within the fluidized-bed combustion reactor,
    extracting from the combustion reactor a mixture comprising particles of the redox active mass and bottom ash through an extraction line arranged in the bottom of the combustion reactor,
    feeding the mixture with a controlled flow rate into a separation zone comprising a lower part of said conveying zone, arranged below an upper part of the conveying zone into which the solid hydrocarbon feed is fed,
    injecting a second fluidization gas into the separation zone, the injection being performed by controlling the flow rate of the second fluidization gas:
    so as to separate by elutriation the redox active mass particles and the bottom ash agglomerated within the mixture, said the particles of the redox active mass being then conveyed to the combustion reactor and the bottom ash agglomerated within the mixture falling under the effect of gravity to the bottom of the separation zone where it is discharged, and
    so that the velocity of the gas from the mixture of first fluidization gas and second fluidization gas in the upper part of the conveying zone is higher than the terminal velocity of the solid hydrocarbon feed particles and the terminal velocity of the solid particles present in said combustion reactor,
    and said injection is performed by controlling also the temperature of the second fluidization gas in such a way that the temperature of the conveying zone is less than or equal to 500° C.

2. The method as claimed in claim 1, wherein the superficial gas velocity in the dilute phase of the conveying zone ranges between 2 m/s and 50 m/s.

3. The method as claimed in claim 1, wherein the solid hydrocarbon feed in particle form is fed into the conveying zone through gravity flow by means of a gravity flow pipe, and the solid hydrocarbon feed flow is controlled through regulation and sealing means arranged between the gravity flow pipe and a buffer zone for temporary storage of the solid hydrocarbon feed in particle form.

4. The method as claimed in claim 1, wherein the solid hydrocarbon feed in particle form is fed into the conveying zone by means of an endless screw, the endless screw being supplied by a gravity flow of solid feed coming from a buffer zone for temporary storage of the solid hydrocarbon feed in particle form, and the solid hydrocarbon feed flow is controlled through regulation and sealing means arranged between the endless screw and the buffer zone.

5. The method as claimed in claim 1, wherein the solid hydrocarbon feed in particle form is fed into the conveying zone by means of a dense pneumatic conveying line, the dense pneumatic conveying line being supplied by a gravity flow of solid feed coming from a buffer zone for temporary storage of the solid hydrocarbon feed in particle form and by a carrier gas, and the solid hydrocarbon feed flow is controlled through regulation and sealing means arranged between the dense pneumatic conveying line and the buffer zone.

6. The method as claimed in claim 1, wherein a raw solid hydrocarbon feed is sent from a storage zone to a mill so as to shape the hydrocarbon feed in particle form, the flow of the raw solid hydrocarbon feed being controlled by regulation and sealing means arranged between the mill and the storage zone, then the hydrocarbon feed in particle form is fed into conveying zone by means of a pipe supplied from the mill into which a carrier gas is sent for carrying the feed into the pipe.

7. The method as claimed in claim 1, wherein the conveying zone is a substantially vertical pipe.

8. The method as claimed in claim 1, wherein the redox active mass reduced in the combustion reactor is reoxidized in an oxidation reactor prior to being again contacted with the solid hydrocarbon feed in the combustion reactor.

9. The method as claimed in claim 1, wherein the solid hydrocarbon feed is selected from among coal, coke, pet coke, biomass, bituminous sands and household, agricultural or industrial waste.

10. A plant for chemical looping redox combustion of a solid hydrocarbon feed by oxidation-reduction in a chemical loop wherein a redox active mass circulates in particle form, comprising a combustion reactor and an oxidation reactor, the combustion reactor comprising:
   a supply means for the redox active mass in particle form coming from the oxidation reactor,
   a third fluidization gas supply means,
   a supply means for a solid hydrocarbon feedstock in particle form, the solid hydrocarbon feedstock supply means comprising:
      a conveying zone operating under fluidized bed conditions for conveying the solid hydrocarbon feed to the combustion reactor, the conveying zone having a temperature less than or equal to 500° C.,
      means for injecting the solid hydrocarbon feed in particle form into the conveying zone, and
      means for injecting a first fluidization gas into the conveying zone, and the oxidation reactor comprising:
      a supply means for the redox active mass particles reduced in the combustion reactor,
      an oxidizing gas supply means,
      a discharge means for the oxidizing gas reduced after oxidation of the redox active mass, and
   a discharge means for sending the reoxidized redox active mass particles to the combustion reactor,
   a pipe for extracting a mixture comprising redox active mass particles and agglomerated bottom ash contained in the combustion reactor, the extraction pipe being positioned in the bottom of the reactor,
   a separation zone comprising a lower part of the conveying zone, for separation by elutriation of the particles of the mixture coming from the extraction pipe, the separation zone comprising:
      a supply means for the mixture coming from the extraction pipe, the supply means comprising means of controlling the flow rate of the mixture fed into the separation zone,
      means for injecting a second fluidization gas,
      a dilute phase zone of the fluidized bed in the upper part of the separation zone, and
         an agglomerated bottom ash discharge means arranged in the lower part of the separation zone.

11. A combustion plant as claimed in claim 10, wherein the means for injecting the solid hydrocarbon feed into the conveying zone comprise a gravity flow pipe opening into the conveying zone, the pipe being supplied by a buffer zone via regulation and sealing means allowing the solid feed flow to be controlled.

12. A combustion plant as claimed in claim 10, wherein the means for injecting the solid hydrocarbon feed into the conveying zone comprise an endless screw opening into the conveying zone, the endless screw being supplied by a buffer zone via regulation and sealing means allowing the solid feed flow to be controlled.

13. A combustion plant as claimed in claim 10, wherein the means for injecting the solid hydrocarbon feed into the conveying zone comprise a dense pneumatic conveying line opening into the conveying zone, the conveying line comprising means for injecting a carrier gas intended to carry the solid hydrocarbon feed particles flowing from a buffer zone to the conveying zone, the flow of solid hydrocarbon feed particles from the buffer zone to the conveying line being controlled by regulation and sealing means.

14. A combustion plant as claimed in claim 10, wherein the means for injecting the solid hydrocarbon feed into the conveying zone comprise:
   a raw solid hydrocarbon feed storage zone,
   a mill for crushing the raw solid hydrocarbon feed coming from the storage zone in the form of particles capable of being fluidized in conveying zone, the mill comprising carrier gas injection means,
   a pipe receiving a mixture of carrier gas and of solid hydrocarbon feed particles from the mill, and opening into the conveying zone.

* * * * *